May 14, 1963 M. E. HINES 3,089,921

MULTIPLEX MESSAGE TRANSMISSION

Filed July 7, 1960 2 Sheets-Sheet 1

INVENTOR
M. E. HINES
BY
ATTORNEY

INVENTOR
M. E. HINES
BY R. B. Andis
ATTORNEY

United States Patent Office 3,089,921

Patented May 14, 1963

3,089,921
MULTIPLEX MESSAGE TRANSMISSION

Marion E. Hines, Summit, N.J., assignor to Bell Telephone Laboratories, Incorporated, New York, N.Y., a corporation of New York Filed July 7, 1960, Ser. No. 41,360
18 Claims. (Cl. 179—15)

This invention relates generally to the transmission of the contents of a plurality of message channels between a pair of separated terminals and more particularly, although in its broader aspects not exclusively, to the transmission of the contents of many telephone channels over a common path.

In the past, both frequency division and time division techniques have been used to multiplex message channels for common path transmission. The former involve continuous transmission and use modulated carrier waves to space the different message channels in different parts of the frequency spectrum, while the latter make use of synchronous switches to sample the channels repetitively and permit use of the whole available frequency spectrum by all channels on a time shared basis. Time division methods are particularly well suited for use in connection with such inherently noise resistant transmission systems as those employing pulse code modulation, since they provide samples of the contents of each channel which can conveniently be converted into code groups of pulses and spaces.

The present invention is closely related to time division multiplex in that it employs synchronous switching techniques to combine the contents of many message channels for common path transmission. It is, moreover, equally well suited for use in connection with pulse code modulation transmission. It affords an additional noise advantage over conventional time division multiplex, however, particularly at times when some of the multiplexed channels are idle. The invention does this by transmitting composite samples of the contents of all of the multiplexed channels instead of merely transmitting sequential samples taken from each channel individually. The effect of noise which might otherwise have appeared in only a few channels during transmission is thus distributed among all channels. The effect on any individual channel is reduced and, if some channels are idle, an over-all net noise advantage is gained.

In accordance with the invention in its broader aspects, the contents of a plurality of message channels are transmitted between a separated pair of terminals simply by establishing a succession of recurring groups of time intervals or slots and combining samples of the contents of all channels to form different linear sum and difference combinations in all of the time slots of each group. The resulting composite samples are, in accordance with the invention, demultiplexed at the receiving terminal by combining the composite samples from all time slots in each group to form the same linear sum and difference combinations in each of the receiving message channels. Each receiving channel thus receives a succession of individual message samples. The individual message samples in each channel are, in turn, converted to the original message in the usual manner merely by passing the samples through a low pass filter.

From a more specific point of view, the invention combines the contents of $n$ message channels for common path transmission by establishing a succession of recurring groups or cycles of time slots containing $n$ time slots each and combining samples of the contents of all of the message channels to form different linear sum and difference combinations in all of the time slots of each group in accordance with an orthogonal square matrix of order $n$ made up of elements of $\pm1$, where $n$ is, in general, an integer greater than unity and is, in a number of preferred embodiments of the invention, a positive integral power of 2. It is for this reason that the invention can be described accurately by the term, matrix multiplex. Since $n$ different sum and difference combinations of each set of samples are transmitted as composite samples during each cycle, the sampling rate per channel is $2n$ times the highest message frequency to be transmitted.

Still from the relatively specific point of view, the composite samples are, in accordance with the invention, demultiplexed at the receiving terminal by combining composite samples from all time slots of each group or cycle to form different linear sum and difference combinations in each of the receiving message channels in accordance with the same orthogonal square matrix. Again, the individual message samples recovered in each channel are converted to the original message in the usual manner with the aid of a low pass filter.

The fundamental practicability of the invention in the multiplex transmission of messages is illustrated by a very simple example. That example is the multiplexing of the contents of two message channels in accordance with an orthogonal square matrix of order 2 made up of the requisite elements of $\pm1$. Thus $$\begin{bmatrix} a \\ b \end{bmatrix} \begin{bmatrix} +1 & +1 \\ +1 & -1 \end{bmatrix} = \begin{bmatrix} a+b \\ a-b \end{bmatrix} \qquad (1)$$

where $a$ and $b$ represent samples of the respective message channels. The composite samples generated at the transmitting terminal in accordance with the invention are alternate linear sum and difference combinations of the individual channel samples. At the receiving terminal, $$\begin{bmatrix} a+b \\ a-b \end{bmatrix} \begin{bmatrix} +1 & +1 \\ +1 & -1 \end{bmatrix} = \begin{bmatrix} a+b+a-b \\ a+b-a+b \end{bmatrix} = \begin{bmatrix} 2a \\ 2b \end{bmatrix} \qquad (2)$$

In each receiving channel, the resulting sample is thus directly proportional to the corresponding individual message sample at the transmitting terminal.

A more complete understanding of the invention and its various features may be obtained from the following detailed description of two specific embodiments. In the drawings.

Figure 1:
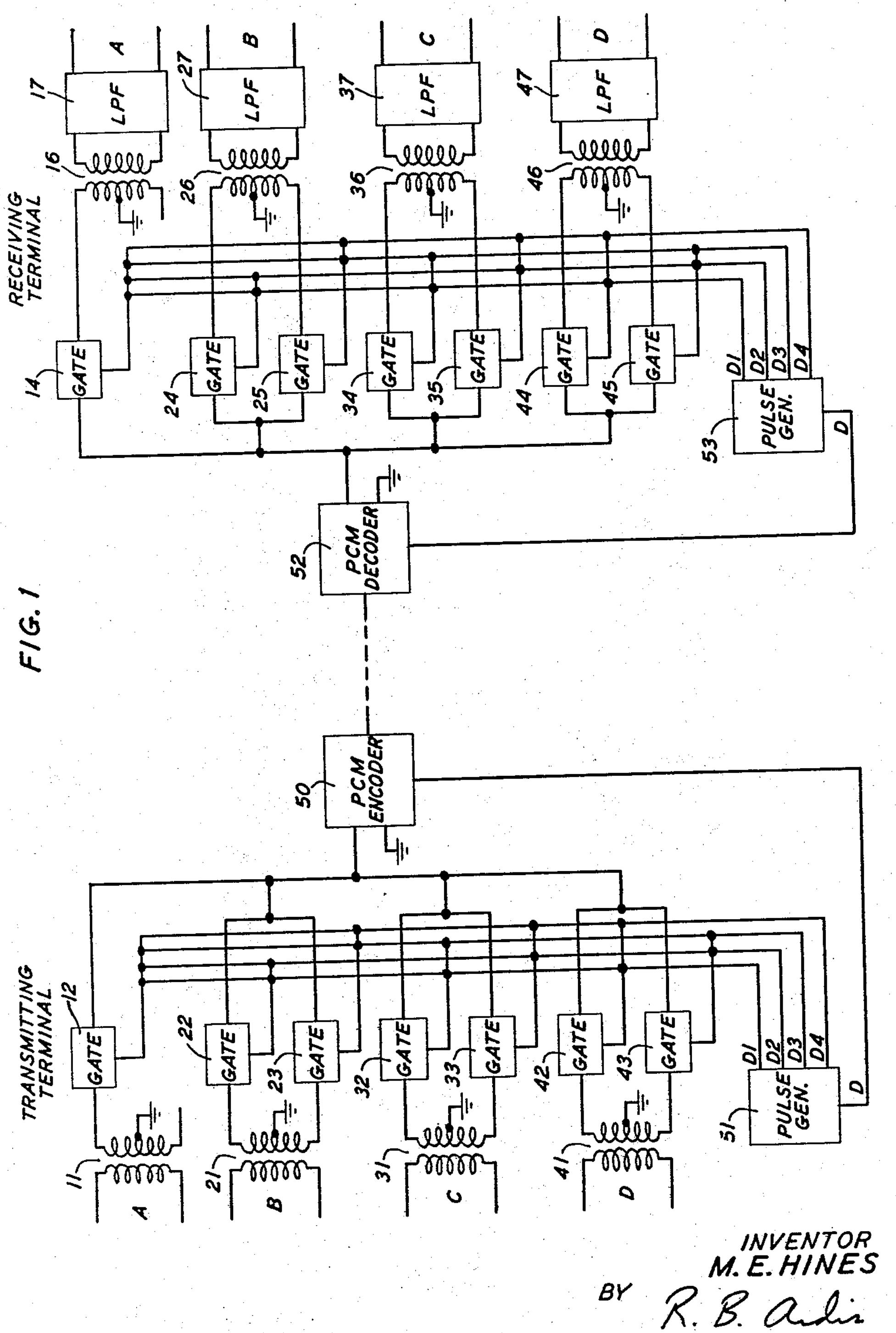
FIG. 1 is a combination block and schematic diagram of one four-channel embodiment of the invention using pulse code modulation for transmission from transmitting to receiving terminal.

In the embodiment of the invention illustrated in FIG. 1, the four message channels are labeled A, B, C, and D, respectively, at both the transmitting terminal and the receiving terminal. At the transmitting terminal, they are coupled to a suitable combination of gate circuits through respective transformers 11, 21, 31, and 41. The secondary winding of each transformer has a grounded center tap so that the voltage appearing at one end of the winding is opposite in phase from that appearing at the other end.

The contents of each message channel at the transmitting terminal in the embodiment of the invention shown in FIG. 1 are sampled by the gate circuitry to the right of transformers 11, 21, 31, and 41 to produce composite samples. The composite samples are interleaved in time and are applied to a suitable pulse code modulation encoder for conversion to a form of the binary permutation code for noise-resistant transmission to the receiving terminal. As illustrated, a gate 12 couples the upper half of transformer 11 (i.e., the upper half of its secondary winding) to encoder 50 while the lower half is left unused. A gate 22 couples the upper half of transformer 21 to encoder 50 and a gate 23 does the same to the lower half. A gate 32 couples the upper half of transformer 31 to encoder 50, a gate 33 couples the lower half of transformer 31 to encoder 50, a gate 42 couples the upper half of transformer 41 to encoder 50, and a gate 43 couples the lower half of transformer 41 to encoder 50.

Figure 2:
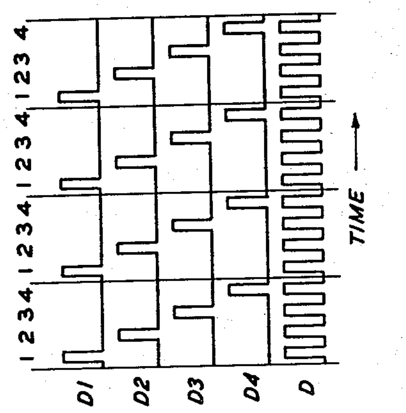
FIG. 2 illustrates some of the timing pulses used at various points in the embodiment of the invention shown in FIG. 1.

The various gate circuits at the transmitting terminal in FIG. 1 are enabled by timing pulses supplied from appropriate leads of a timing pulse generator 51. As shown in FIG. 2, these timing pulses establish the recurring groups or cycles of time slots required for the sampling and multiplexing operations. In the illustrated embodiment of the invention, each group or cycle contains four time slots. The D1 lead of pulse generator 51 bears a positive-going pulse during the first time slot of each group, the D2 lead bears a simiar pulse during the second time slot of each group, and so on. The D lead of pulse generator 51 bears a positive-going pulse during every time slot, as shown in the bottom line of FIG. 2, and is connected to encoder 50 to synchronize the encoding process generally.

In accordance with the principles of the invention, samples of the contents of the four message channels at the transmitting terminal in FIG. 1 are combined to form different linear sum and difference combinations in all four time slots of each group in accordance with an orthogonal square matrix of order 4 made up of elements of ±1. Thus, $$\begin{bmatrix} a \\ b \\ c \\ d \end{bmatrix} \begin{bmatrix} +1 & +1 & +1 & +1 \\ +1 & +1 & -1 & -1 \\ +1 & -1 & +1 & -1 \\ +1 & -1 & -1 & +1 \end{bmatrix} = \begin{bmatrix} a+b+c+d \\ a+b-c-d \\ a-b+c-d \\ a-b-c+d \end{bmatrix} \quad (3)$$

where *a*, *b*, *c*, and *d* represent samples of the contents of message channels A, B, C, and D, respectively. In order to combine samples from all channels in accordance with such a matrix, the energizing terminal of gate 12 is connected to the D1, D2, D3, and D4 leads of pulse generator 51, and those of the remaining gates are connected to other appropriate combinations of two of these leads. Gate 22 is energized by the D1 and D2 leads, gate 23 is energized by the D3 and D4 leads, gate 32 is energized by the D1 and D3 leads, gate 33 is energized by the D2 and D4 leads, gate 42 is energized by the D1 and D4 leads, and gate 43 is energized by the D2 and D3 leads.

In operation, the gate circuitry at the transmitting terminal in the embodiment of the invention shown in FIG. 1 thus combines samples of the contents of all four message channels in phase addition during the first time slot of each group and combines the same samples half in phase addition and the remainder in phase opposition during each of the remaining three time slots. As shown in Equation 3, the contents of different message channels are selected for combination in phase opposition with the others in each of the last three time slots.

The contents of the original message channels are recovered at the receiving terminal in the embodiment of the invention illustrated in FIG. 1 by a process which is, in a sense, the inverse of that at the transmitting terminal. A pulse code modulation decoder 52 restores the incoming signals to the form of successive composite samples of the contents of all message channels. These composite samples are distributed through a bank of gates to four transformers 16, 26, 36, and 46. The primary winding of each transformer has a grounded center tap to provide phase opposition between voltages applied to the two halves. The secondary winding of transformer 16 is connected through a low pass filter 17 to receiving channel A, and those of transformers 26, 36, and 46 are connected through similar low pass filters 27, 37, and 47 to receiving channels B, C, and D.

The bank of gate circuits in the receiving terminal of FIG. 1 includes a gate 14 connected between decoder 52 and the upper half of transformer 16 (i.e., the upper half of its primary winding). Like transformer 11 in the transmitting terminal, transformer 16 is left with its lower half unused. The other receiving channels, however, contain two gates each. A gate 24 is connected from decoder 52 to the upper half of transformer 26 and a gate 25 is connected to the lower half. In a similar manner, a pair of gates 34 and 35 are connected to the upper and lower halves of transformer 36 and a pair of gates 44 and 45 are connected to the upper and lower halves of transformer 46. A timing pulse generator 53, substantially identical to timing pulse generator 51 at the transmitting terminal, supplies enabling pulses to the various gates and timing pulses to decoder 52. As illustrated, gate 14 is controlled by the D1, D2, D3, and D4 leads of pulse generator 53, gate 24 by the D1 and D2 leads, gate 25 by the D3 and D4 leads, gate 34 by the D1 and D3 leads, gate 35 by the D2 and D4 leads, gate 44 by the D1 and D4 leads, and gate 45 by the D2 and D3 leads. Again, the pulses on the respective leads of pulse generator 53 are as shown in FIG. 2.

The receiving terminal in the embodiment of the invention shown in FIG. 1 separates the contents of the various message channels by combining received composite samples from all four time slots of each cycle to form different linear sum and difference combinations in each receiving channel in accordance with the same orthogonal square matrix of order 4 used in the transmitting terminal. Thus, $$\begin{bmatrix} a+b+c+d \\ a+b-c-d \\ a-b+c-d \\ a-b-c+d \end{bmatrix} \begin{bmatrix} +1 & +1 & +1 & +1 \\ +1 & +1 & -1 & -1 \\ +1 & -1 & +1 & -1 \\ +1 & -1 & -1 & +1 \end{bmatrix}$$

$$= \begin{bmatrix} a+b+c+d+a+b-c-d+a-b+c-d+a-b-c+d \\ a+b+c+d+a+b-c-d-a+b-c+d-a+b+c-d \\ a+b+c+d-a-b+c+d+a-b+c-d-a+b+c-d \\ a+b+c+d-a-b+c+d-a+b-c+d+a-b-c+d \end{bmatrix}$$

$$= \begin{bmatrix} 4a \\ 4b \\ 4c \\ 4d \end{bmatrix} \quad (4)$$

The matrix, it will be noted, is both the inverse of and identical to the matrix employed at the transmitting terminal. As shown, composit samples from all four time slots are combined in phase addition in receiving channel A. They are, in accordance with the principles of the nivention, combined half in phase addition and the remainder in phase opposition in the remaining receiving channels in the same pattern used at the transmitting terminal. The extraneous components cancel one another in each receiving channel, leaving only samples proportional to the original samples taken of the contents of the corresponding channels at the transmitting terminal. The original message waves are recovered with the aid of low pass filters 17, 27, 37, and 47.

As has already been indicated, a system like that illustrated in FIG. 1 enjoys a noise advantage over conventional time division multiplex systems at times when some of the multiplexed channels are idle. The greater the number of idle channels, of course, the greater is the noise advantage. Even with such an inherently noise resistant transmission scheme as pulse code modulation, it is possible that bursts of noise on the line will cause distortion or even complete loss of the contents of an occasional time slot or group of time slots. In a conventional time division multiplex system, the effect was confined to the corresponding message channel but, within that message channel, the full effect was felt. In the present system, no single channel feels the full effect of any burst of noise, since composite samples of the contents of all message channels are transmitted during each time slot. The effect of such noise is thus spread over all of the message channels and the effect on any single channel is much less. When a number of the multiplexed channels are idle, their share of the noise is of no consequence, so the net effect on the system as a whole is reduced.

The noise advantage conferred by the invention is, in general, realized in any system in which the various channels have an undesirable statistical behavior in that the root-mean-square or average signal is quite small in comparison to the peak signals which may have to be transmitted. A system in which some channels are frequently idle is, perhaps, the most obvious example. Another important example, however, is a system carrying signals (such as voice) where the root-mean-square value is normally small.

The invention is, of course, by no means limited in its applicability to the multiplexing of only two or four channels or to pulse code modulation transmission. In general, any integral number of channels may be multiplexed, positive integral powers of 2 most conveniently of all. The present disclosure is confined to four channel systems only to avoid obscuring the principles of the invention with unnecessary detail. Transmission between terminals may be by pulse code modulation, as shown, or by such other pulse modulation methods as pulse amplitude modulation or pulse position modulation. With no translation at all, the output of the transmitting terminal resembles a pulse amplitude modulation message.

Figure 3:
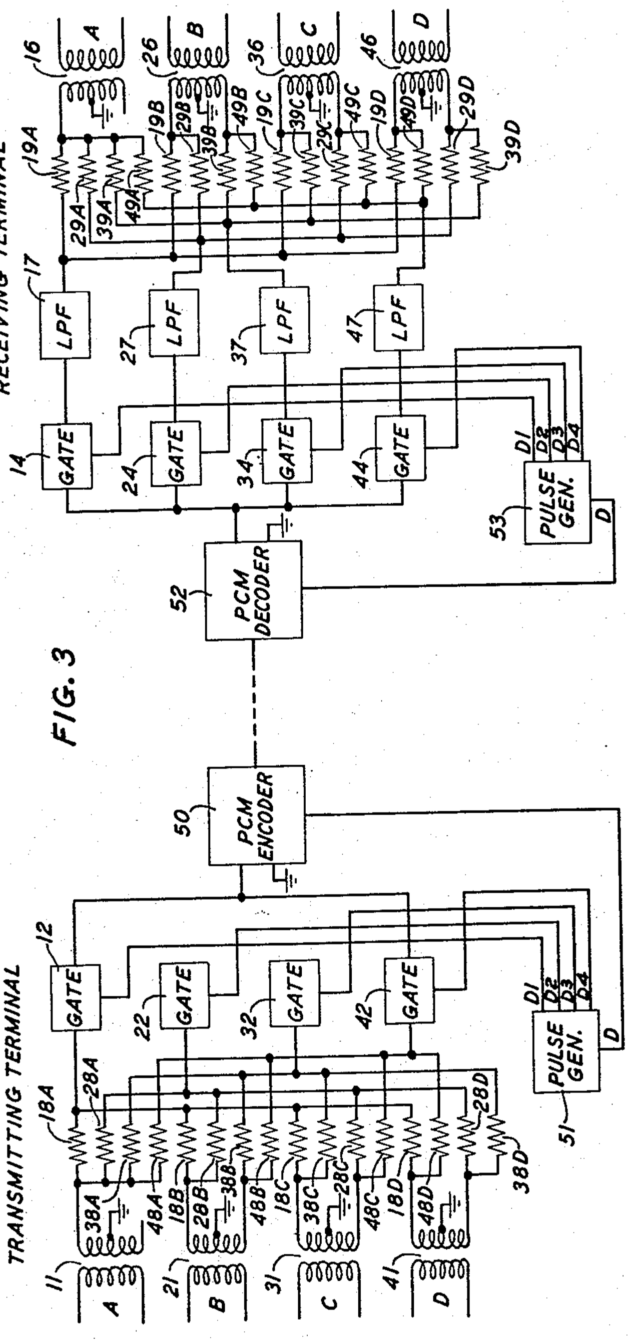
FIG. 3 illustrates an alternative four-channel embodiment of the invention using pulse code modulation for transmission between terminals.

That the results afforded by the invention can be realized with even fewer gate circuits than used in FIG. 1 is shown by the alternative embodiment shown in FIG. 3. The circuitry bears the same general outline as in FIG. 1, but at the transmitting terminal the gate circuitry is limited to gates 12, 22, 32, and 42 and at the receiving terminal it is limited to gates 14, 24, 34, and 44. To avoid any necessity for the use of additional gates, a bank of summing resistors is inserted between the gates and transformers at the transmitting terminal and a corresponding bank is inserted between the gates and transformers at the receiving terminal. In addition, low pass filters 17, 27, 37, and 47 are placed between the gates and the summing resistors at the receiving terminal.

In the alternative embodiment of the invention illustrated in FIG. 3, the logic is supplied primarily by the summing resistor banks instead of by timing pulse generators 51 and 53. At the transmitting terminal, gate 12 is connected to the upper portion of transformers 11, 21, 31, and 41 by resistors 18A, 18B, 18C, and 18D, respectively. Gate 22 is connected to the upper portion of transformers 11 and 21 by resistors 28A and 28B and to the lower portion of transformers 31 and 41 by resistors 28C and 29D. Gate 32 is connected to the upper portion of transformers 11 and 31 by resistors 38A and 38C and to the lower portion of transformers 21 and 41 by resistors 38B and 38D. Finally, gate 42 is connected to the upper portion of transformers 11 and 41 by resistors 48A and 48D and to the lower portion of transformers 21 and 31 by resistors 48B and 48C. Gate 12 is enabled only by pulses on timing pulse generator lead D1, and gates 22, 32, and 42 are similarly enabled only by pulses on timing pulse generator leads D2, D3, and D4, respectively. All four gates are connected directly to encoder 50.

At the receiving terminal in FIG. 3, the recovered composite samples from decoder 52 are supplied directly to gates 14, 24, 34, and 44 and, through them, to low pass filters 17, 27, 37, and 47, respectively. Gate 14 is enabled by pulses on the D1 lead of timing pulse generator 53, gate 24 is enabled by pulses on the D2 lead, and gates 34 and 44 are enabled by pulses on the D3 and D4 leads, respectively.

As in the transmitting terminal, the logic in the receiving terminal in the alternative embodiment of the invention shown in FIG. 3 resides primarily in the bank of summing resistors, which serves to combine the received composite samples with the proper phase relationships. Filter 17 is connected through resistor 19A to the upper portion of transformer 16, through resistor 19B to the upper portion of transformer 26, through resistor 19C to the upper portion of transformer 36, and through resistor 19D to the upper portion of transformer 46. Filter 27 is similarly connected to the upper portions of transformers 16 and 26 through resistors 29A and 29B, respectively, and to the lower portions of transformers 36 and 46 through resistors 29C and 29D. Filter 37 is connected to the upper portion of transformers 16 and 36 through resistors 39A and 39C, respectively, and to the lower portions of transformers 26 and 46 through resistors 39B and 39D. Finally, filter 47 is connected to the upper portion of transformers 16 and 46 through resistors 49A and 49D, respectively, and to the lower portion of transformers 26 and 36 through resistors 49B and 49C.

The operation of the embodiment of the invention illustrated in FIG. 3 is, in general, substantially the same as that of the one illustrated in FIG. 1. It is somewhat simpler, in that there are fewer gate circuits and the summing resistor banks are simpler than the missing gates. The summing resistor banks do, however, impose a measure of signal attenuation that may be undesirable if not counteracted by gain in the gate circuits or in some other manner. Low pass filters 17, 27, 37, and 47 may, of course, be placed in the individual receiving channel circuits to the right of transformers 16, 26, 36, and 46 instead of in the position illustrated in FIG. 3 to operate with equal effect.

It is to be understood that the above-described arrangements are illustrative of the application of the principles of the invention. Numerous other arrangements may be devised by those skilled in the art without departing from the spirit and scope of the invention.

What is claimed is:

1. An arrangement for transmitting the contents of a plurality of message channels between a pair of terminals which comprises timing means for establishing a succession of recurring groups of time slots and means for combining samples of the contents of all of said message channels in all of the time slots of each of said groups to form a respectively different linear sum and difference combination in each time slot of every group.

2. An arrangement for transmitting the contents of a plurality of message channels between a pair of terminals which comprises timing means for establishing a succession of recurring groups of time slots, each of said groups containing the same number of time slots, and means for combining samples of the contents of all of said message channels to form different linear sum and difference combinations in all of the time slots of each of said groups in accordance with an orthogonal square matrix made up of elements of $\pm 1$.

3. An arrangement for transmitting the contents of a plurality of message channels between a pair of terminals which comprises timing means for establishing a succession of recurring groups of time slots, each of said groups containing the same number of time slots, means for combining samples of the contents of all of said message channels in phase addition in one of the time slots of each of said groups, and means for combining samples of the contents of all of said message channels half in phase addition and the remainder in phase opposition in each of the remaining time slots of each of said groups, the contents of different message channels being combined in phase opposition in each of said remaining time slots.

4. An arrangement for transmitting the contents of $n$ message channels between a pair of terminals which comprises timing means for establishing a succession of recurring groups of time slots containing $n$ time slots each and means for combining samples of the contents of all of said message channels in all of the time slots of each of said groups to form a respectively different linear sum and difference combination in each time slot of every group where $n$ is an integer greater than unity.

5. A combination in accordance with claim 4 in which $n$ is a postiive integral power of 2.

6. An arrangement for transmitting the contents of $n$ message channels between a pair of terminals which comprises timing means for establishing a succession of recurring groups of time slots containing $n$ time slots each and means for combining samples of the contents of all of said message channels to form different linear sum and difference combinations in all of the time slots of each of said groups in accordance with an orthogonal square matrix of order $n$ made up of elements of $\pm 1$, where $n$ is an integer greater than unity.

7. A combination in accordance with claim 6 in which $n$ is a positive integral power of 2.

8. An arrangement for transmitting the contents of $n$ message channels between a pair of terminals which comprises timing means for establishing a succession of recurring groups of time slots containing $n$ time slots each, means for combining samples of the contents of all of said message channels in phase addition in one of the time slots of each of said groups, and means for combining samples of the contents of all of said message channels half in phase addition and the remainder in phase opposition in each of the remaining time slots of each of said groups, the contents of different message channels being combined in phase opposition in each of said remaining time slots, where $n$ is an integer greater than unity.

9. A combination in accordance with claim 8 in which $n$ is a positive integral power of 2.

10. An arrangement for sending the contents of a plurality of message channels at a transmitting terminal to a like plurality of channels at a receiving terminal which comprises means for establishing a succession of recurring groups of time slots, means for combining samples of the contents of all of said message channels at said transmitting terminal to form composite samples in the form of different linear sum and difference combinations in all of the time slots of each of said groups, and means for combining composite samples from all time slots in each of said groups at said receiving terminal to form different linear sum and difference combinations in each of the receiving channels.

11. An arrangement for sending the contents of a plurality of message channels at a transmitting terminal to a like plurality of channels at a receiving terminal which comprises means for establishing a succession of recurring groups of time slots, each of said groups containing the same number of time slots, means for combining samples of the contents of all of said message channels at said transmitting terminal to form composite samples in the form of different linear sum and difference combinations in all of the time slots of each of said groups in accordance with an orthogonal square matrix made up of elements of $\pm 1$, and means for combining composite samples from all time slots in each of said groups at said receiving terminal to form different linear sum and difference combinations in each of the receiving channels in accordance with the same matrix.

12. An arrangement for sending the contents of a plurality of message channels at a transmitting terminal to a like plurality of channels at a receiving terminal which comprises means for establishing a succession of recurring groups of time slots, each of said groups containing the same number of time slots, means for combining samples of the contents of all of said message channels in phase addition at said transmitting terminal to form composite samples in one of the time slots of each of said groups, means for combining samples of the contents of all of said message channels half in phase addition and the remainder in phase opposition at said transmitting terminal to form composite samples in each of the remaining time slots of each of said groups, the contents of different message channels being combined in phase opposition in each of said remaining time slots, means for combining composite samples from all time slots in each of said groups in phase addition at said receiving terminal in one of the receiving channels, and means for combining composite samples from all time slots in each of said groups half in phase addition and the remainder in phase opposition at said receiving terminal in the remaining receiving channels, the composite samples in different time slots being combined in phase opposition in each of said remaining receiving channels.

13. An arrangement for transmitting the contents of $n$ message channels at a transmitting terminal in time division multiplex to $n$ channels at a receiving terminal which comprises means for establishing a succession of recurring groups of time slots containing $n$ time slots each, means for combining samples of the contents of all of said message channels at said transmitting terminal to form composite samples in the form of different linear sum and difference combinations in all of the time slots of each of said groups, and means for combining composite samples from all time slots in each of said groups at said receiving terminal to form different linear sum and difference combinations in each of the receiving channels, where $n$ is an integer greater than unity.

14. A combination in accordance with claim 13 in which $n$ is a positive integral power of 2.

15. An arrangement for transmitting the contents of $n$ message channels at a transmitting terminal in time division multiplex to $n$ channels at a receiving terminal which comprises means for establishing a succession of recurring groups of time slots containing $n$ time slots each, means for combining samples of the contents of all of said message channels at said transmitting terminal to form composite samples in the form of different linear sum and difference combinations in all of the time slots of each of said groups in accordance with an orthogonal square matrix of order $n$ made up of elements of $\pm 1$, and means for combining composite samples from all time slots in each of said groups at said receiving terminal to form different linear sum and difference combinations in each of the receiving channels in accordance with the same matrix, where $n$ is an integrer greater than unity.

16. A combination in accordance with claim 15 in which $n$ is a positive integral power of 2.

17. An arrangement for transmitting the contents of $n$ message channels at a transmitting terminal in time division multiplex to $n$ channels at a receiving terminal which comprises means for establishing a succession of recurring groups of time slots containing $n$ time slots each, means for combining samples of the contents of all of said message channels in phase addition at said transmitting terminal to form composite samples in one of the time slots of each of said groups, means for combining samples of the contents of all of said message channels half in phase addition and the remainder in phase opposition at said transmitting terminal to form composite samples in each of the remaining time slots of each of said groups, the contents of different message channels being combined in phase opposition in each of said remaining time slots, means for combining composite samples from all time slots in each of said groups in phase addition at said receiving terminal in one of the receiving channels, and means for combining composite samples from all time slots in each of said groups half in phase addition and the remainder in phase opposition at said receiving terminal in the remaining receiving channels, the composite samples in different time slots being combined in phase opposition in each of said remaining receiving channels, where *n* is an integer greater than unity.

18. A combination in accordance with claim 17 in which *n* is a positive integral power of 2.

References Cited in the file of this patent

UNITED STATES PATENTS

| | | |
|---|---|---|
| 2,657,253 | Bedford | Oct. 27, 1953 |
| 2,698,379 | Boelens et al. | Dec. 28, 1954 |